United States Patent Office 2,700,680
Patented Jan. 25, 1955

2,700,680

SUBSTITUTED GLYCINAMIDES

William F. Bruce, Havertown, and Joseph Seifter, Willow Grove, Pa., assignors, by mesne assignments, to American Home Products Corporation, New York, N. Y., a corporation of Delaware No Drawing. Application January 23, 1951,
Serial No. 207,451

1 Claim. (Cl. 260—559)

This invention relates to new substituted glycinamides of the types having the formula

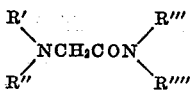

which have been found useful either as intermediates in chemical syntheses or as therapeutic agents.

The compounds of the invention may be utilized in the preparation of other compounds, as for example quaternary ammonium salts, or complex acetamides or fatty acid amides. In addition, compounds falling within the scope of the invention have been found to possess a pharmacological action useful in the medicinal field. In this respect such compounds demonstrated at least one of the following actions: local anesthetic, pressor, depressor, convulsant, spasmolytic, analgesic, soporific or sedative actions.

In the graphical formula as given above, R' is intended to represent a lower alkyl, while R" is intended to stand for an aromatic radical of the aralkyl series with R'" and R"" representing alkyl radicals.

Where R', R", R'" or R"" represent or contain a hydrocarbon chain, it may be of the straight or branched-chain type. Furthermore, when R' or R" represent aromatic radicals, these are intended to cover not only the unsubstituted rings but the hydroxy and alkoxy substituted members.

With regard to aralkyl radicals particularly, this term will be understood to cover only the unsubstituted hydrocarbon radical, and specifically a radical having from one to four carbon atoms in the alkyl chain, one of which is connected to the amino nitrogen atom. Also contemplated are hydroxy- and lower alkoxy-substituted aralkyl radicals with the substituents on the ring and/or on the alkyl chain. The aryl portion of the radical which may comprise one or two phenyl rings is attached either to one carbon atom, as in the case of the benzyl or the diphenylmethyl radical, or to the next adjacent carbon atom, as in the case of the beta-phenylethyl radicals.

It is further contemplated that the alkyl chain and/or the aryl portion of the aralkyl radical may be hydroxy- or lower alkoxy-substituted, such radicals imparting improved solubility characteristics to the glycinamide compound.

Preferred aromatic radicals may be represented graphically by the formula,

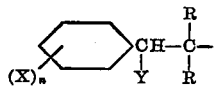

where X and Y may be either hydrogen, hydroxy or lower alkoxy groups, n stands for a small, whole number from 1 to 3, while R, R represent either hydrogen or methyl radicals.

In general, the compounds of the invention may be synthesized by reacting an appropriate chloroacetamide corresponding to the formula

with an appropriate secondary amine corresponding to the formula R'R"NH where R', R" and

represent the radicals as indicated hereinbefore. The secondary amine may be prepared in known manner and one method is illustrated in the specific examples.

Where the reaction of amine with the chloroacetamide is unduly slow, one may prepare the sodio-derivative of the amine which reacts readily with the chloroacetamide. The preferred method for the preparation of the chloroacetamide intermediate involves reacting chloroacetyl chloride with a dialkyl amine

in the presence of benzene, toluene, chloroform or ether as a solvent for the reactants. Heating may or may not be necessary depending on the speed of the particular reaction. The chloroacetamide remains in solution in the solvent and is obtained by distilling off the solvent under reduced pressure. In general, a molar ratio of chloride to amine of about 1:2 is preferred for the reaction.

The reaction of the appropriate chloroacetamide and the appropriate secondary amine to form the desired substituted glycinamide is preferably operated with a molar ratio, amide to amine of about 1:1, and is carried out in the presence of a solvent for the reactants such as higher alcohols having four to seven carbon atoms in the molecule, dioxane or hydrocarbon solvents such as xylene. The reaction is carried out in the presence of an acid acceptor or mildly basic material such as alkali or alkaline earth metal carbonates, sodium bicarbonate or alkali metal alcoholates and preferably about 2 to 3 mols of this material is used. Pyridine may also be used as an acid binding agent in a molar ratio of 1:1. The reaction operation is set up for refluxing and the reaction temperature is the refluxing temperature of the particular solvent selected. Generally, a reaction or refluxing time of about 10–15 hours is sufficient for complete reaction. In the event that solids are formed these are removed by filtration, the substituted glycinamide product remaining in solution in the solvent. The solvent is finally removed by distillation at low pressures to obtain the desired product.

It is known that certain amines possess a vaso-constrictor action and are identified as pressor amines. As an important feature of the invention, it has been discovered that when pressor amines are used as intermediates in the preparation of the substituted glycinamides, the new products possess pronounced physiological actions. While pressor amines themselves possess a certain amount of local anesthetic action, a surprising increase in anesthetic action has been found in the corresponding glycinamide compounds.

It has been discovered in the compounds of the invention having the general formula

that when the radicals

and

are the residues of secondary pressor amines, a critically new physiological action is found that is different from the physiological action of the secondary pressor amines alone. As an example, when the secondary pressor amine l-ephedrine is condensed with N-alpha-chloraceto-N,N-dialkyl, it has been found that the secondary pressor amine residue

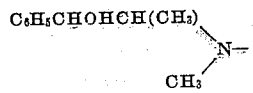

imparts to the glycinamide enhanced local anesthetic action far superior to the anesthetic action of l-ephedrine itself. Moreover, this enhanced action is noted when either

or

is a secondary pressor amine residue, particularly in the case where

is a secondary pressor amine residue, and more particularly when both are secondary pressor amine residues. In addition, while l-ephedrine, a well-known vasoconstrictor, has an adrenaline ratio of 0.005–0.01, the ratio for alpha-ephedrino-N,N-diethyl acetamide is 0.005, showing a surprising and highly desirable pressor action for a local anesthetic. It should be pointed out, however, that the use of secondary pressor amines is not invariably necessary in order to obtain substituted glycinamides having highly useful physiological properties.

The following example is illustrative of the method of preparation.

EXAMPLE

*Preparation of alpha-(N-methyl-N-2-hydroxy-1-methyl-2-phenyl-ethylamino)-N,N-diethyl acetamide*

A solution of 16.4 grams of l-ephedrine and 15 grams of chloro-N,N-diethyl acetamide in 50 cc. of n-butyl alcohol, together with 8 grams of powdered anhydrous sodium carbonate was refluxed for 15 hours and without filtering was distilled in vacuo. The butanol was removed on a water bath. The product, a pale yellow oil, boiled at 186–190° C. at a pressure of 4 mm. The yield of alpha-(N-methyl-N-2-hydroxy-1-methyl-2-phenylethylamino)-N,N-diethyl acetamide, weighted 4 grams.

This application is a continuation-in-part of application Serial No. 684,239, filed July 17, 1946, now abandoned.

We claim:

The new compound, alpha-(N-methyl-N-2-hydroxy-1-methyl-2-phenylethylamino)-N,N-diethyl acetamide.

References Cited in the file of this patent

UNITED STATES PATENTS

| Number | Name | Date |
|---|---|---|
| 2,139,190 | Iselin et al. | Dec. 6, 1938 |
| 2,269,147 | Dickey et al. | Jan. 6, 1942 |
| 2,295,655 | Hentrich et al. | Sept. 15, 1942 |
| 2,317,999 | Leuchs | May 4, 1943 |
| 2,374,337 | Dickey et al. | Apr. 24, 1945 |
| 2,411,662 | Martin et al. | Nov. 26, 1946 |
| 2,447,587 | Martin et al. | Aug. 24, 1948 |

FOREIGN PATENTS

| Number | Country | Date |
|---|---|---|
| 172,748 | Japan | May 22, 1946 |
| 534,129 | Great Britain | Feb. 27, 1941 |

OTHER REFERENCES

Marini-Bettolo et al.: "Gazz. Chim. Ital.," vol. 80, May 1950, pp. 288 and 291.

Chiavarelli et al.: "Gazz. Chim. Ital.," vol. 81 (1951), page 96.